United States Patent [19]

Kito

[11] Patent Number: 5,414,234
[45] Date of Patent: May 9, 1995

[54] STUD WELDING METHOD

[75] Inventor: Masaru Kito, Toyohashi, Japan

[73] Assignee: Emhart Inc., Newark, Del.

[21] Appl. No.: 148,053

[22] Filed: Nov. 5, 1993

[30] Foreign Application Priority Data

Nov. 6, 1992 [JP] Japan .................. 4-297368

[51] Int. Cl.⁶ .............................................. B23K 9/20
[52] U.S. Cl. ........................................ 219/99; 219/123
[58] Field of Search ............................. 219/98, 99, 123

[56] References Cited

U.S. PATENT DOCUMENTS 388,245  8/1888  Benardos ........................... 219/123
4,190,760  2/1980  Kano et al. ....................... 219/123

FOREIGN PATENT DOCUMENTS 0167150  2/1985  European Pat. Off. .

Primary Examiner—Clifford C. Shaw
Attorney, Agent, or Firm—E. D. Murphy

[57] ABSTRACT

A welding comprises placing the end of a stud supported by a welding gun on a welding portion of a workpiece, producing an arc discharge across the stud and the workpiece, melting the end of the stud and a portion of the workpiece and bringing the end of the stud so as to abut on the melted portion of the workpiece. A hollow cylindrical member 21 is prepared so that the material has a larger inside diameter than an end 20 of a stud 19 and is made of a magnetic permeable material. During the arc discharge, the cylindrical member 21 is placed so that the hollow portion is positioned on the side of the workpiece opposite to the stud and corresponding to the end of the stud.

1 Claim, 3 Drawing Sheets

STUD WELDING METHOD

BACKGROUND OF THE INVENTION

Field of Invention

The present invention relates to a stud welding method to weld a stud supported by a welding gun to a workpiece by means of an arc discharge.

Description of the Prior Art

There is a well-known stud welding method comprising placing the tip of a stud supported by a welding gun at a welding portion of a workpiece, producing an arc discharge across the stud and the workpiece, melting the tip of the stud and a portion of the workpiece by the discharge, and making the stud tip abut upon the melted portion of the workpiece. For example, when a component is to be mounted on a vehicle body, a stud is welded to the vehicle body and a clip for supporting the component is attached to the stud.

In welding a stud as stated above, and particularly when studs are welded near the ends of a workpiece, it is known that arc discharges tend toward the center of the workpiece, causing an arc blow, so that the melted portion of the workpiece deviates from the center of the stud. When the stud is brought into contact with the workpiece, the welding force holding the stud may be so weak as to be a cause of breakage. If the melted portion is largely out of position, a fillet may stick to an upper portion of the stud to sometimes impair the function of the stud.

Summary of the Invention

The purpose of the present invention is to provide a stud welding method which, even near an end portion of a workpiece, prevents an arc discharge from deviating from the center of the stud.

In order to achieve the above-described object, according to the present invention, there is provided a stud welding method comprising the steps of placing the tip of a stud supported by a welding gun at a welding portion of a workpiece, producing an arc discharge across the stud and the workpiece, melting the tip of the stud and a portion of the workpiece by said discharge, and bringing workpiece, characterized in that a hollow cylindrical member is provided which has a larger inside diameter than the stud tip and which is made of a magnetic permeable material. The cylindrical member, during said arc discharge, is placed so that the hollow portion thereof is positioned on the workpiece surface, on the side opposite to the stud and at a location corresponding to that of the stud tip.

BRIEF DESCRIPTION OF ACCOMPANYING DRAWINGS

DESCRIPTION OF A PREFERRED EMBODIMENT

Figure 1:
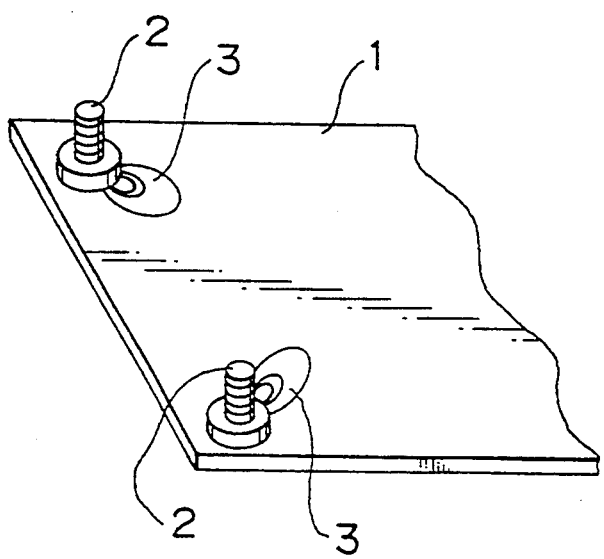
FIG. 1 is a schematic illustration of the creation of arc blows at end portions of a workpiece in prior stud welding methods.
Figure 2:
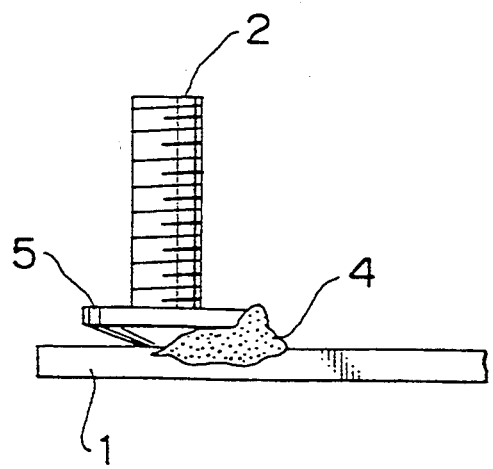
FIG. 2 is a schematic illustration of a melted portion of a prior art weld which has been moved off-center by an arc blow.

In welding a stud in accord with the prior art, and particularly when studs 2 are welded to ends of a workpiece 1 as shown in FIG. 1, it is known that arc discharges tend to focus toward the center of the workpiece which causes arc blows 3. As a result, the melted portion 4 of the workpiece 1 is shifted from the center of an end 5 of the stud 1 as shown in FIG. 2. When the stud end 5 is brought to abut on the workpiece 1, the welding force of the stud is so weak as to be a cause of separation. If the melted portion 4 is largely out of position, a fillet may stick to an upper portion of the stud to sometimes impair the function of the stud.

In accord with this invention, it is now believed that the cause of the deviation of an arc discharge toward the center of the workpiece is that a magnetic field produced by an electric current based on the arc discharge is uniform about the tip of the stud in a center area of the workpiece but is non-uniform near the ends of the workpiece.

Figure 3:
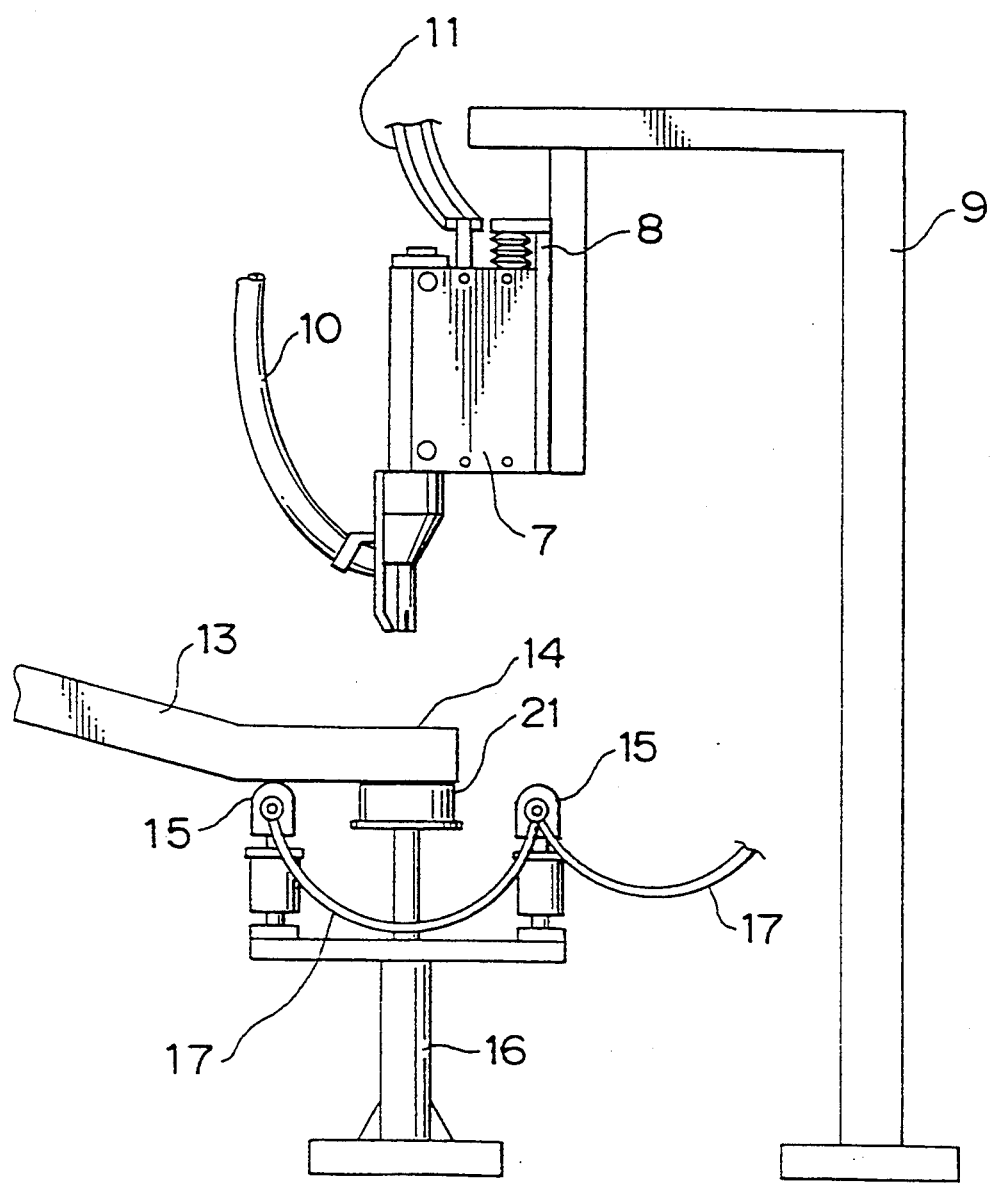
FIG. 3 shows a stud welding device to carry out the stud welding method according to the present invention.

In the embodiment of this invention shown in FIG. 3, a welding gun 7 is supported by a stand 9 through a bracket 8, and a feed pipe 10 for studs are attached to the welding gun 7 to automatically receive a stud at the end of the gun 7. The bracket 8 supports the welding gun 7 vertically movably and a cable 11 including a power line, a control line and the like is connected to the gun 7. By the operation of a controller, the end of the stud supported by the welding gun 7 is positioned at a welding portion 14 of a workpiece 13 and an arc discharge is produced across the stud and the workpiece. The discharge melts the stud end and a portion of the workpiece and the stud is welded to the workpiece when the end of stud is brought to abut on the melted portion of the workpiece. On the side of the workpiece 12 opposite to the stud, that is, the lower surface of the workpiece, electrodes 15, 15 for grounding the workpiece 13 are provided, with a stand 16 inbetween, and ground lines 17 are respectively connected the electrodes 15.

Figure 4:
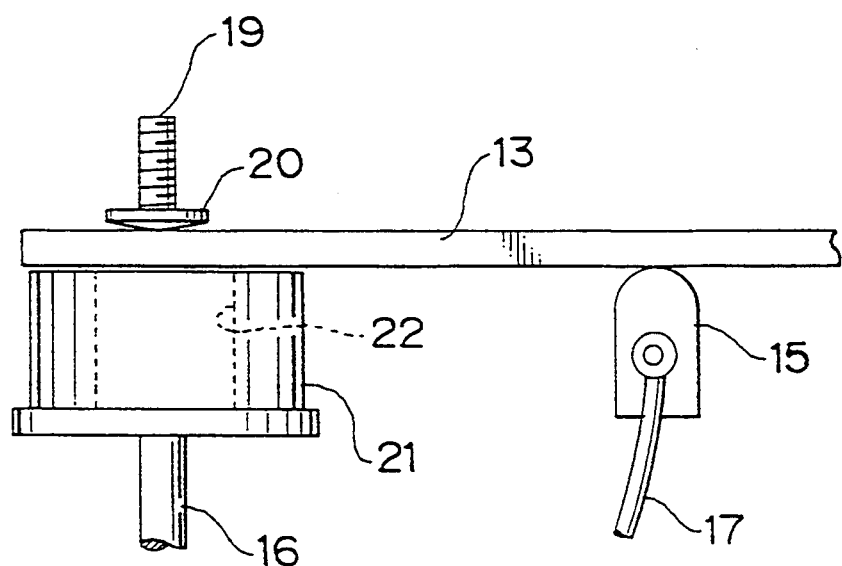
FIG. 4 shows the relation among a workpiece, a stud and a cylindrical member used in the stud welding method according to the present invention.

As shown in detail also in FIG. 4, according to the present invention, a hollow cylindrical member 21 which has a larger inside diameter than an end 20 of a stud 19 and is made of a magnetic permeable material is placed on the stand 16 so that the center of a hollow portion 22 can be in a position which is on the side of the workpiece opposite to the stud 19 (the lower surface in the embodiment) and corresponds to the end 20 of the stud 19. The cylindrical member is made of, for example, a high, magnetic permeable material used for the iron core of a transformer and has an annular configuration. The cylindrical member 21 must be placed in the above-mentioned position (its center positioned correspondingly to the end 20 of the stud 19) during the arc discharge.

In a specific instance, welding an M8 × 12 mm stud to the workpiece as shown in FIG. 3, was not satisfactory without the cylindrical member 21 because an arc blow moved the melting portion out of position. Then, an annular-shaped cylindrical member 21 having an outer diameter of 80 mm, a height of 30 mm and an inner diameter of 50 mm was placed so that the center of the hollow portion 22 can be in a position which is on the surface of the workpiece on the opposite side to the stud 19 but corresponding to the end 20 of the stud 19 during an arc discharge. With this, arc blows ceased to be produced and welding was carried out satisfactorily, that is, whereas a magnetic field produced by an electric current based on the arc discharge was deviated near the end 14 of the workpiece 13 in the previous case, the magnetic field became uniform once the cylindrical member 21 was placed and arc blows were prevented from being caused.

Accordingly, the present invention covers a simple method including the steps of placing a hollow cylindrical member during arc discharging so that the center thereof is positioned on the side of the workpiece opposite to the stud and corresponding to the end of the stud, a melting portion centers on a spot below the stud thereby to increase the welding force and to prevent an arc blow which may cause a fillet to be adhered to an upper portion of the stud, thus achieving reliable and strong welding of the stud even to an end portion of the workpiece. This invention may be applied to welding studs to workpieces of various metals including steel and aluminum.

We claim:

1. A stud welding method for welding a metal stud to a work piece at a location closely adjacent to an edge thereof and for providing a symmetrical weld bead co-axial with the stud comprising the steps of:

placing the tip of a stud supported by a welding gun at a welding location adjacent to at least one edge of a work piece;

producing an arc discharge across the stud and the work piece;

melting the tip of the stud and a portion of the work piece by said discharge;

providing a hollow cylindrical member having a larger inside diameter than the stud tip and being made of a magnetic permeable material;

placing the cylindrical member during said arc discharge so that the hollow portion thereof is positioned on the work piece surface, at the side opposite to the, said member being positioned coaxially with the stud, and operating to constrain molten material of the work piece in a circular pool centered on the axis of the stud and maintaining said member at said location during arc discharging to permit the formation of a symmetrical weld bead about the tip of the stud after termination of the discharge; and;

plunging the stud into the center of the melted portion of the work piece to terminate arc discharging.

* * * * *